United States Patent
Chau et al.

(10) Patent No.: US 12,397,415 B2
(45) Date of Patent: Aug. 26, 2025

(54) METHOD FOR CONTROLLING A ROBOT DEVICE

(71) Applicant: Robert Bosch GmbH, Stuttgart (DE)

(72) Inventors: Rodrigo Chau, Karlsruhe (DE); Hanna Ziesche, Leonberg (DE); Anh Vien Ngo, Nehren (DE); Gerhard Neumann, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 18/192,420

(22) Filed: Mar. 29, 2023

(65) Prior Publication Data

US 2023/0364776 A1 Nov. 16, 2023

(30) Foreign Application Priority Data

May 13, 2022 (DE) ...................... 10 2022 204 724.9

(51) Int. Cl.
*G06V 10/82* (2022.01)
*B25J 9/02* (2006.01)
*G06V 20/50* (2022.01)

(52) U.S. Cl.
CPC ................ *B25J 9/02* (2013.01); *G06V 10/82* (2022.01); *G06V 20/50* (2022.01)

(58) Field of Classification Search
CPC ............ B25J 9/02; G06V 10/82; G06V 20/50
See application file for complete search history.

(56) References Cited

U.S. PATENT DOCUMENTS

| | | |
|---|---|---|
| 2019/0152054 A1 | 5/2019 | Ishikawa et al. |
| 2019/0188840 A1 | 6/2019 | Kwon et al. |
| 2019/0217476 A1 | 7/2019 | Jiang et al. |
| 2020/0086483 A1 | 3/2020 | Li et al. |
| 2021/0129319 A1 | 5/2021 | Kaneko et al. |
| 2022/0161427 A1* | 5/2022 | Yerazunis .............. B25J 9/1674 |
| 2023/0036260 A1* | 2/2023 | Arakawa ................ B25J 9/0096 |
| 2023/0239439 A1* | 7/2023 | Kamon ................ G05D 1/2248 |
| | | 348/144 |
| 2023/0342614 A1* | 10/2023 | Yonetani ................ G06N 3/084 |

(Continued)

FOREIGN PATENT DOCUMENTS

| | | |
|---|---|---|
| DE | 102019002065 A1 | 10/2019 |
| DE | 112017007025 T5 | 10/2019 |

(Continued)

*Primary Examiner* — Dalena Tran
(74) *Attorney, Agent, or Firm* — NORTON ROSE FULBRIGHT US LLP

(57) ABSTRACT

A method for controlling a robot device. The method includes: acquiring an image of an environment of the robot device; processing the image using a neural network, which outputs from the image a respective value image with pixel values for multiple pixels for at least one action parameter value, the pixel value for each pixel indicating an evaluation of an action specified by the action parameter value and the position of the pixel in the value image; selecting, from multiple actions, the particular action from among the multiple actions for which the pixel value of the pixel in the value image is at a maximum for the action parameter value at the position that specifies the action together with the action parameter value; and controlling the robot device to carry out the selected action.

8 Claims, 3 Drawing Sheets

(56) References Cited

U.S. PATENT DOCUMENTS

2024/0096074 A1* 3/2024 Okorn .................. G06N 3/0455
2025/0001595 A1* 1/2025 Tomiie .................. B25J 9/1653

FOREIGN PATENT DOCUMENTS

| DE | 102019122790 A1 | 2/2020 |
|---|---|---|
| DE | 102020112149 A1 | 11/2021 |
| EP | 3783548 A1 | 2/2021 |

* cited by examiner

METHOD FOR CONTROLLING A ROBOT DEVICE

CROSS REFERENCE

The present application claims the benefit under 35 U.S.C. § 119 of German Patent Application No. DE 10 2022 204 724.9 filed on May 13, 2022, which is expressly incorporated herein by reference in its entirety.

FIELD

The present invention relates to a method for controlling a robot device.

BACKGROUND INFORMATION

A robot device, e.g., a robot arm, which is meant to sort objects, should be capable of adapting itself to different situations such as starting states. In particular, the robot device should be able to sort an object regardless of its starting position and the destination position that may depend on the object. However, this may require that the robot device (i.e., a control device of the robot device) takes a longer time period into account, that is, multiple control steps, in its decisions. For instance, while sorting an object, it may be necessary for the robot device to successively displace the object or other objects in different directions before the destination is reached, for instance to circumvent or remove obstacles (e.g., other objects that are situated in the path of the current object).

For this reason, approaches for controlling a robot device are required which allow for a successful and efficient control for different situations that require a (longer) sequence of actions.

SUMMARY

According to different embodiments of the present invention, a method for controlling a robot device is provided, which includes acquiring an image of an environment of the robot device, processing the image with the aid of a neural network, which is designed to output from the image a respective value image with pixel values for multiple pixels for least one action parameter value, the pixel value for each pixel indicating an evaluation of an action that is specified by the action parameter value and the position of the pixel in the value image, the neural network having an encoder network and a decoder network with a bottleneck between the encoder network and the decoder network and skip connections between the encoder network and the decoder network; selecting, from multiple actions, the particular action from among the multiple actions for which the pixel value of the pixel in the value image is at a maximum for the action parameter value at the position that specifies the action together with the action parameter value, and controlling the robot device to carry out the selected action.

The use of an architecture having pass-over connections, i.e., skip connections, makes it possible to retain details with a high granularity and thus enables a high accuracy of the neural network for tasks that require a longer chain of actions of different types or the same types (and thus the selection of control actions over a long time horizon), such as the multi-step moving of objects, e.g., the displacement of objects for sorting into individual bins.

Different exemplary embodiments are provided in the following text.

Exemplary embodiment 1 is a method for controlling a robot device as described above.

Exemplary embodiment 2 is a method according to the exemplary embodiment 1, which includes training of the neural network with the aid of target values for the evaluations, the target values being ascertained with the aid of a second instance of the neural network according to Double-Deep-Q learning.

The use of Double-Deep-Q learning reduces the problem of overestimated Q-values and thereby improves in particular the performance in high-dimensional control tasks featuring long time horizons.

Exemplary embodiment 3 is a method according to the exemplary embodiment 1 or 2, which includes training of the neural network with the aid of target values for the evaluations, the target values being ascertained from rewards of control cycles, and the training is carried out in such a way that a sample (i.e., a tuple of state, action, next state, and reward) of the control cycles is given priority over another sample from the control cycles if the evaluation estimated for the sample by the neural network deviates more strongly from the target value for the evaluation than for the other sample.

In this way, a high accuracy of the neural network is achieved with fewer cycles.

Exemplary embodiment 4 is a method according to one of the exemplary embodiments 1 to 3, in which the neural network is designed to ascertain the evaluation of each action from an intermediate evaluation of the action and an evaluation of a state of the environment of the robot device.

For instance, this is achieved according to a dueling-DQN approach and may improve the accuracy of the evaluations that are output by the neural network.

Exemplary embodiment 5 is a method according to one of the exemplary embodiments 1 to 4, in which an action that is specified by the position of a pixel is an action that is to be carried out at the position of the environment of the robot device that corresponds to the position of the pixel in the value image.

Each pixel of the acquired image corresponds to a position in the environment of the robot device in accordance with its position in the acquired image (because it shows a color value or, in general, a sensor value for this location). Each pixel in each value image corresponds to a position in the acquired image and thus also to a position in the environment. As a result, the control is able to ascertain suitable positions for the execution of actions based on the evaluations.

Exemplary embodiment 6 is a method according to one of the exemplary embodiments 1 to 5, in which the neural network is designed to output an output which includes a respective value image for multiple action parameter values, each of the multiple action parameter values describing a control variable of an action or a type of an action.

By selecting evaluations about multiple types of actions or actions having different parameter values, it is possible to carry out a suitable chain of actions (from a sequence of input images where an individual action is selected from each input image) for the execution of the respective task.

Exemplary embodiment 7 is a method according to one of the exemplary embodiments 1 to 6, in which the environment of the robot device has multiple objects, and the action parameter values indicate whether an object is to be displaced or rotated and/or indicate directions, displacement widths and/or angles of rotation.

In particular, the above method can thus be used for a sorting task or bin-picking task and makes it possible to carry out the task also for a longer chain of actions (different types and/or with different parameters).

Exemplary embodiment 8 is a robot control device which is designed to carry out a method according to one of the exemplary embodiments 1 to 7.

Exemplary embodiment 9 is a computer program, which includes instructions that when executed by a processor, induce the processor to execute a method according to one of the exemplary embodiments 1 to 7.

Exemplary embodiment 10 is a computer-readable medium, which stores commands that when executed by a processor, induce the processor to execute a method according to one of the exemplary embodiments 1 to 7.

In the drawings, similar reference numerals generally relate to the same parts in all the different views. The drawings are not necessarily true to scale, the general focus instead being placed on illustrating the principles of the present invention.

In the following description, different aspects are described with reference to the figures.

DETAILED DESCRIPTION OF EXAMPLE EMBODIMENTS

The following detailed description refers to the figures which, by way of explanation, show special details and aspects of this disclosure based on which the present invention can be implemented. Other aspects may be used, and structural, logical and electrical modifications can be made without deviating from the protective scope of the present invention. The different aspects of this disclosure do not necessarily exclude one another because some aspects of this disclosure are able to be combined with one or multiple other aspect(s) of this disclosure to form new aspects.

Different examples will be described in greater detail in the following text.

Figure 1:
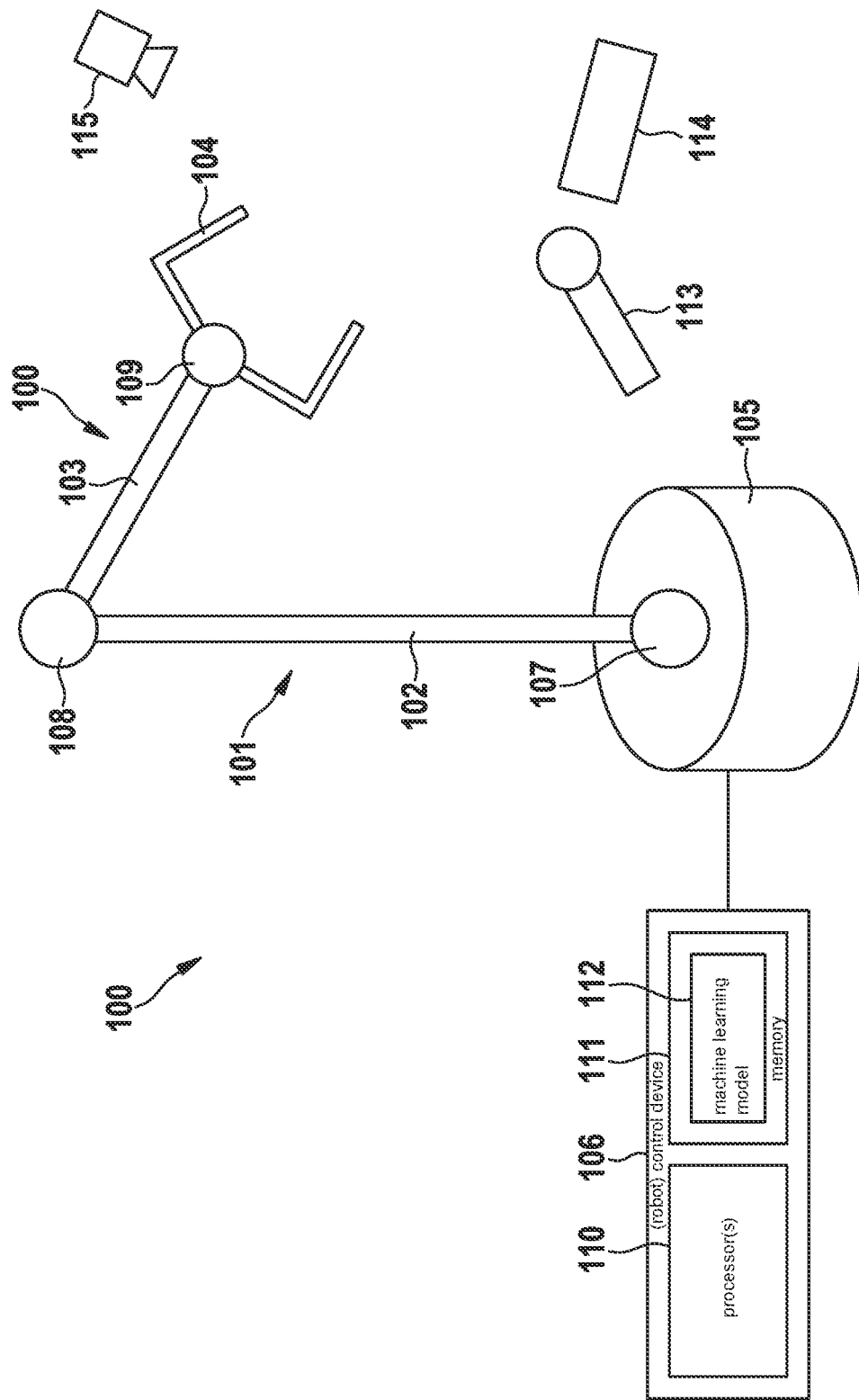
FIG. 1 shows a robot according to an example embodiment of the present invention.

FIG. 1 shows a robot 100.

Robot 100 includes a robot arm 101 such as an industrial robot arm for handling or assembling a workpiece (or one or more other objects). Robot arm 101 includes manipulators 102, 103, 104 and a base (or support) 105 by which manipulators 102, 103, 104 are braced. The term 'manipulator' relates to the movable elements of robot arm 101 whose operation enables a physical reciprocal action with the environment, e.g., to carry out a task. For the control, robot 100 includes a (robot) control device 106, which is designed to implement the reciprocal action with the environment according to a control program. Last element 104 (most remote from support 105) of manipulators 102, 103, 104 is also known as an end effector 104 and may include one or more tools such as a welding torch, a gripper instrument, a painting tool or the like.

The other manipulators 102, 103 (closer to support 105) may form a positioning device so that, together with end effector 104, robot arm 101 is provided together with end effector 104 at its end. Robot arm 101 is a mechanical arm, which can perform functions like a human arm (possibly with a tool at its end).

Robot arm 101 may include articulation elements 107, 108, 109, which connect manipulators 102, 103, 104 to one another and to support 105. An articulation element 107, 108, 109 may have one or more articulations, each being able to provide a rotary movement (i.e., rotary motion) and/or a translatory movement (i.e., displacement) of associated manipulators relative to one another. The movement of manipulators 102, 103, 104 can be initiated with the aid of actuators which are controlled by control device 106.

The term 'actuator' may be understood as a component which is designed to influence a mechanism or process in response to being driven. The actuator is able to implement commands output by control device 106 (commonly referred to as an activation) into mechanical movements. The actuator, e.g., an electromechanical converter, may be configured to convert electrical energy into mechanical energy in response to its activation.

The term 'control device' may be understood as some type of logic unit that implements an entity which, for instance, may encompass a circuit and/or a processor, which is able to execute a software stored on a memory medium, firmware, or a combination thereof, and which can output commands, e.g., to an actuator in the present example. For instance, the control device may be configured by a program code (such as software), for instance, in order to control the operation of a robot device.

In this example, control device 106 has one or more processor(s) 110 and a memory 111, which stores a code and data based on which processor 110 controls robot arm 101. According to different embodiments, control device 106 controls robot arm 101 on the basis of a machine learning model 112, which is stored in memory 111. Robot 100 is meant to manipulate an object 113, for instance.

At any point in time, the overall system of robot arm 101 and object 113 to be manipulated or also of one or more further objects 114 (e.g., of a different type and form) has a certain state with regard to a position, orientation, end-effector state (gripper open/closed), etc. Hereinafter, this state of the system, robot or an object will be referred to as (control) configuration.

A manipulation task that is carried out by a robot arm 101, for instance, typically consists of a sequence of actions. For example, to sort an object 113 (e.g., into one of multiple associated bins), must shift this object around another object 114 or push it out of the way. It may also happen that robot arm 101 can displace object 113 only a certain (limited) distance in a displacement action so that multiple shifting actions are required to reach the respective bin.

In many tasks such as in a sorting task as described above, it is therefore necessary that a robot control device take a long time horizon, that is, a longer series of control actions, into account in its considerations, i.e., the decision process as to which actions are to be carried out, because it must be able to recognize whether or not a certain action that is carried out at a current (control) instant will attain the goal in the long term. The state space (i.e., the space of the possible control configurations) and also the space of the possible actions (such as the number of possible displacement directions) may be considerable, which, for instance, further complicates the control (that is, the selection of the control actions, which includes the selection of the displacement direction, for instance). Algorithms are therefore desirable which enable a control under such conditions.

According to different embodiments, a control strategy (policy) is trained that makes such a successful control possible under those conditions.

A current state (that is, the state for a current control instant for which the control device selects a control action) is given, for instance, by an image (e.g., an RGB image or an RGBD image, that is, a color image including depth information) of the working range of robot arm 101, which is supplied by a camera 115 (which, for example, is situated above the working range in which objects 113, 114 are situated).

According to different embodiments, a neural network (e.g., as an ML model 112) is provided, which is trained in such a way that it interprets such an image and learns that different objects 113, 114 (e.g., objects having different forms) are to be pushed into different target bins (and into which bin such an object (e.g., a respective type or a respective form) is to be sorted.

Figure 2:
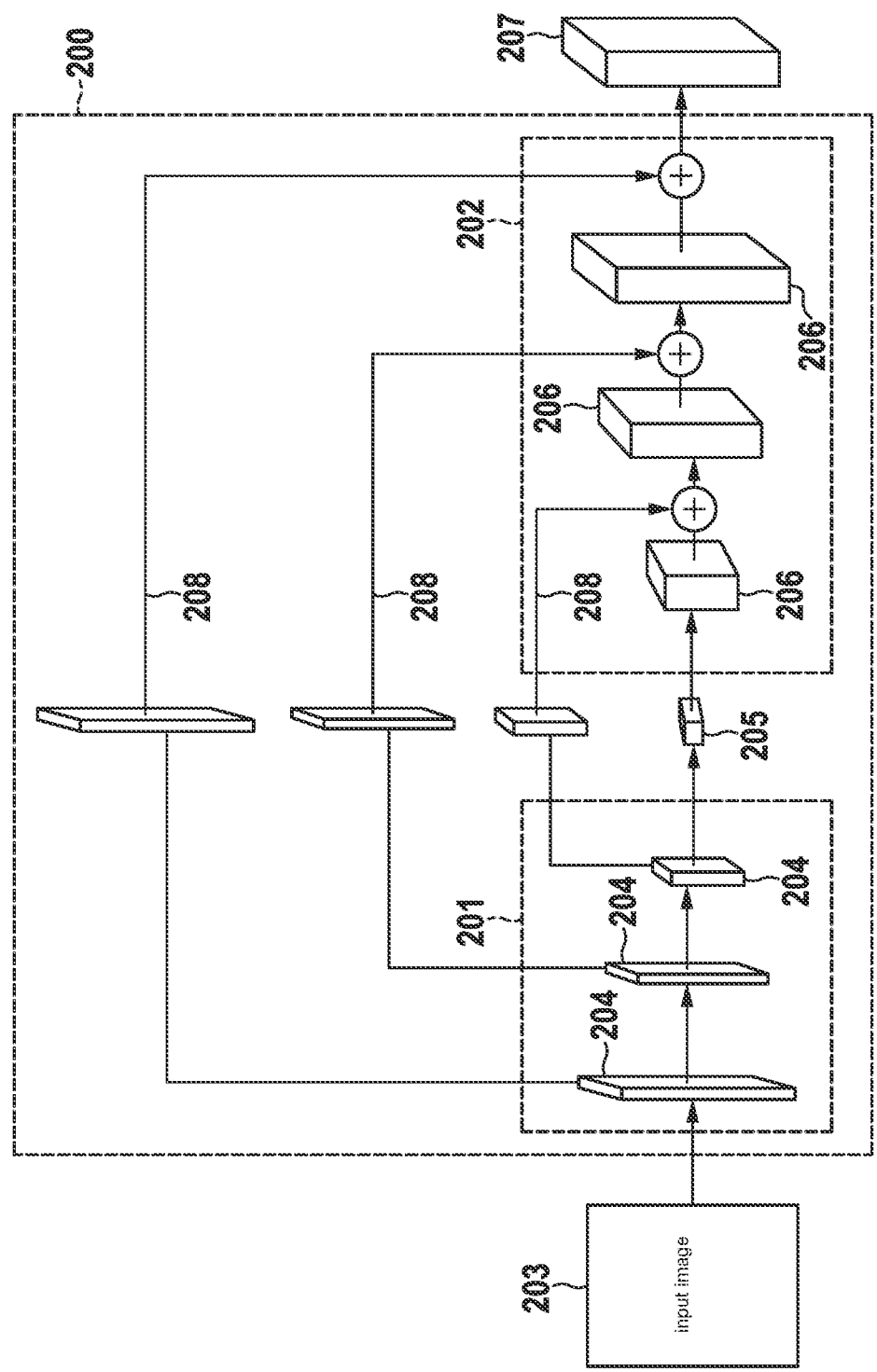
FIG. 2 shows a neural network according to one example embodiment of the present invention.

FIG. 2 shows a neural network 200 according to one embodiment.

Neural network 200 has an encode-decoder architecture featuring an encoder network 201 and a decoder network 202.

Encoder network 201 receives an input image 203 of the dimension h×w (height times width in pixels, each pixel thus corresponding to an x-y position of the working range of robot arm 101, for example) and generates from input image 203 successive representations 204 of a decreasing dimension up to a representation in a latent space 205 (e.g., a vector in a latent space 205). For instance, each representation is generated by an individual convolution layer (and therefore is a feature map, for instance).

The decoder network uses the element from the latent space to generate successive tensors 206 of an increasing dimension (in the h- and w-direction, i.e., with an increasing resolution) up to an output tensor 207 of the dimension n×h×w, n being a function of the respective application. The tensors may also be generated by respective convolution layers. It is also possible that each image of the output tensor is generated by an own (output) head.

Latent space 205 is a bottleneck, that is, a constriction, of the neural network.

For example, in the afore-described application, n is the number of possible displacement directions. More generally, n is the number of discrete parameter values of a skill (a displacement in this case) that is able to be performed at a certain position (e.g., the x-y position of the working range of robot arm 101).

Here, a skill is understood to denote that it can be performed for different parameters and at different positions, from which different actions result. For instance, if the skill is a "displacement" and can be carried out (at a position where the object is currently located) in the x-direction, then the action is a displacement in the x-direction at a specific position, or if it can be carried out in the y-direction, the action is a displacement in the y-direction at a specific position (or also in other directions, depending on the dimension of n).

Each one of the n images of the n×h×w output tensor is allocated to a parameter value of the skill.

The output tensor assigns an action value to each pixel of the n images of the n×h×w output tensor. The action value of a pixel of an image is a value of the action according to the parameter value assigned to the image and according to the position to which the pixels correspond (that is, the action is given by the skill with the parameter value assigned to the image and the position of the pixel). It should be noted that the resolution of the images in output tensor 203 may also be smaller than in input image 207; however, the same dimension is assumed here for the sake of simplicity.

In the above example, the value of a pixel in an image that is allocated to the x-direction, for example, is a displacement that the robot arm carries out at the position of the pixel in the x-direction. For instance, the robot displaces an object that is located there, the robot pushing the object against the object at the position of the pixel.

The value of each pixel represents the benefit (in the form of an evaluation) of the respective action, and control device 107 may therefore use the pixel values to directly select the best combination of action and position by ascertaining a combination for which the pixel value is at a maximum.

The images of output tensor 203 may also be assigned to actions of different skills, e.g., a portion of the images to displacement actions and a portion of the images to rotation actions (with an associated parameter value in each case or also a parameter value set, such as a direction, angle of rotation, or also a displacement distance etc., or a combination thereof).

In this case, too, the images are allocated to different parameter values, and a parameter may also be or include a type of an action (e.g., parameter value 1: a 90-degree rotation; parameter value 2: a 180-degree rotation; parameter value 3: a displacement by 10 cm; parameter value 4: a displacement by 20 cm, etc.).

According to different embodiments, a neural network 200 thus is trained according to an image-based Q-learning (i.e., a Deep Q learning) approach.

The goal of Q-Learning is to enable reinforcement learning (RL) in that it ascertains a sufficiently precise approximation of the Q-function of the Markov decision process (MDP). The Q-function evaluates how advantageous it is to perform a certain action a in a given state s and to thereby change to a different state. It is typically given by $$Q(s, a) = R(s, a) + \gamma \max_{a'} Q(s', a')$$

Thus, it is the sum of the direct reward R(s,a) and the discounted future reward that the agent receives starting from the state s'. The discount factor γ controls the compromise between the optimization of the short-term and long-term reward. The respective RL agent is able to generate the optimum strategy π* by a sufficiently precise estimation of the Q-function by selecting the action with the highest Q-value in every time step, that is, $$\pi^*(s) = \arg\max_{a} Q(s, a)$$

To approximate the Q-function, Deep-Q-learning algorithms use neural networks, that is, Q-networks. After selecting an action, control device 107 is able to execute a control according to the action (for instance, it includes a control module, which receives specifications of actions and generates corresponding control signals for these for actuators of robot arm 101).

As described above, Q-network 200 according to one embodiment has an encoder-decoder architecture which accepts images 203 as input and outputs an output tensor 207 of values for the actions that correspond to the respective images (and pixel positions).

However, an application of Q-learning to a high-dimensional control tasks with a long time horizon such as the sorting of objects may have little success. For instance, the control strategy may easily be caught up in local optima, and the robot (or its control device) is unable to understand the way in which objects should be moved to satisfactorily carry out the task.

According to different embodiments, a successful application to control tasks under such conditions, in particular the requirement of longer chains of actions, i.e., a long time horizon in the control, is made possible by introducing a skip connection 208 into neural network 200, or in other words, the neural network has an hourglass or Unet architecture, for instance.

Each skip connection 208 forwards a representation 204 to a respective adder 209, which adds (or, more generally, combines, for instance using trainable weights as the case may be) representation 204 to each image of the respective tensor (whose images have the same dimension as the representation).

According to different embodiments, for the control for a high-dimensional control task featuring a long time horizon, one or more of a prioritized experience replay, double q-learning and dueling networks is/are used in addition.

Prioritized experience replay selects experiences (i.e., samples) as a function of their surprise value during learning, i.e., the absolute difference between a prediction (Q (s, a) of neural network 200 and a respective target label y (which is used for a monitored training of neural network 200). For instance, a rank-based prioritization based on the surprise value with a power-law distribution of α=2 is used.

In DQN, the label (that is, the target value) y for training Q-network 200 is calculated as $$y = R + \gamma \max_a Q^*(s', a)$$

With the aid of such labels, neural network 200 is able to be $$L = |Q(s,a) - y|^2$$

trained to reduce a loss
(summed or averaged across many pairs of states and actions).

The second term of the sum, the expected future reward, is the estimation of the reward that can be obtained starting from s'. Q* denotes a target network here, whose weights are copied from Q-network 200 every (for instance) 1000 iterations (that is, a second instance of the neural network which is updated at certain intervals). In Double DQN, the calculation of the label is modified in the following way:

$$y = R + \gamma Q^*\left(s', \arg\max_a Q(s', a)\right)$$

In this case, the selected action is not necessarily the action having the maximum value from the output of the target network but the action that the current Q-network considers to be the most rewarding. This approach decouples the action selection and action evaluation and reduces the problem of overestimated Q-values.

To implement dueling networks, the output (such as feature maps) is applied in duplicate upstream from the last convolutional layer of network 200 (i.e., of decoder 202) and conveyed to the last convolutional layer and a state value branch. In the architecture, the last convolutional layer is responsible for condensing the feature maps to the output dimensions n×h×w, e.g., 8×224×224. This task is treated as an advantage stream (and the pixel values included therein may be considered intermediate evaluations).

The state value branch receives the same feature maps as input, condenses them to an output n×h×w and flattens the result (to h×w, e.g., by a convolution). Next, it combines these values with the aid of a fully linked linear layer so that a single scalar value V(s) is produced as output. The final network output (for a current state and an action a) then is $$Q(s, a) = V(s) + \left(A(s, a) - \frac{1}{|\mathcal{A}|}\sum_{a'} A(s, a')\right)$$

$\mathcal{A}$ is the space of the actions.

Figure 3:
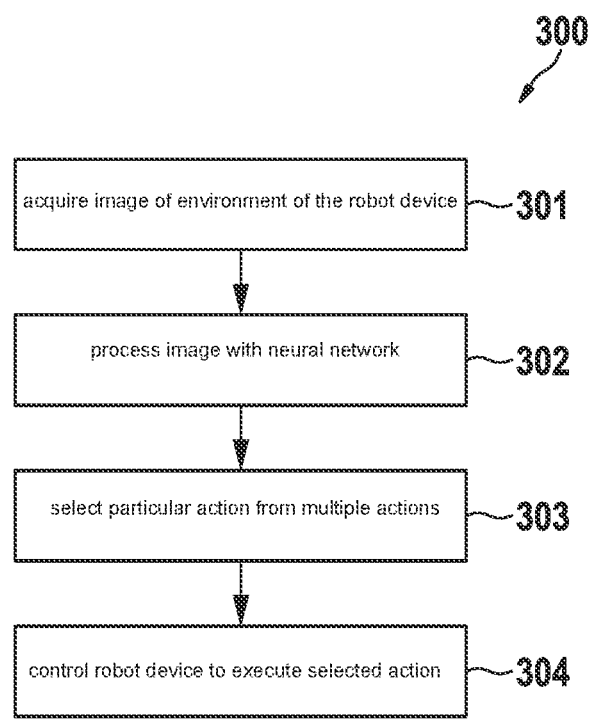
FIG. 3 shows a flow diagram which represents a method for controlling a robot device according to one example embodiment of the present invention.

In summary, according to different embodiments, a method as illustrated in FIG. 3 is provided.

FIG. 3 shows a flow diagram 300 which represents a method for controlling a robot device according to one embodiment.

In 301, an image of an environment of the robot device is acquired.

In 302, the image is processed with the aid of a neural network, which is designed to output from the image a respective value image with pixel values for multiple pixels for at least one action parameter value, the pixel value for each pixel indicating an evaluation of an action specified by the action parameter value and the position of the pixel in the value image. The neural network has an encoder network and a decoder network with a bottleneck between the encoder network and the decoder network and skip connections between the encoder network and the decoder network.

In 303, the particular action is selected from multiple actions (e.g., from all actions) for which the pixel value of the pixel in the value image is at a maximum among the multiple actions for the action parameter value at the position that specifies the action together with the action parameter value.

In 304, the robot device is controlled to execute the selected action.

The method of FIG. 3 is able to be executed by one or multiple computer(s) using one or multiple data processing unit(s). The term 'data processing unit' may be understood as any type of entity that allows for the processing of data or signals. The data or signals, for example, may be treated according to at least one (i.e., one or more than one) special function that is executed by the data processing unit. A data processing unit may include an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or some other combination thereof or be made up of such. Some other way of implementing the respective functions described in greater detail herein may also be understood as a data processing unit or logic circuit system. One or more of the method steps described in detail herein is/are able to be executed (e.g., implemented) by a data processing unit by one or more special functions that are executed by the data processing unit.

The approach of FIG. 3 is used to generate a control signal for a robot device. The term 'robot device' may be understood as referring to any technical system (having a mechanical part whose movement is controlled) such as a computer-controlled machine, a vehicle, a household appliance, an electric tool, a production machine, a personal assistant or an access system. A control rule for the technical system is learned and the technical system can then be controlled accordingly.

Different embodiments are able to receive and use sensor signals from different sensors such as video, radar, lidar, ultrasonic, motion, thermal, etc., in order to obtain sensor data with regard to configurations and scenarios and also rewards.

Although special embodiments were illustrated and described here, one skilled in the art will recognize that the special embodiments illustrated and described may be exchanged for a multitude of alternative and/or equivalent implementations without departing from the protective scope of the present invention. This application is meant to cover any adaptations or variations of the special embodiments disclosed herein.

What is claimed is:

1. A method for controlling a robot device, comprising the following steps:
    acquiring an image of an environment of the robot device, the environment being a working range of a robot arm of the robot device;
    processing the image using a neural network, the neural network being configured to output from the image for at least one action parameter value, a respective value image with pixel values for multiple pixels, the pixel value for each pixel of the multiple pixels indicating an evaluation of an action that is specified by the action parameter value and the position of the pixel in the value image, and the neural network being configured to ascertain an evaluation of each action from an intermediate evaluation of the action and an evaluation of a state of the environment of the robot device, wherein the neural network has an encoder network and a decoder network with a bottleneck between the encoder network and the decoder network and skip connections between the encoder network and the decoder network;
    selecting, from multiple actions that characterize a skill of the robot device in each case, a particular action from among the multiple actions for which the pixel value of the pixel in the value image is at a maximum for the action parameter value at the position that specifies the action together with the action parameter value; and
    controlling the robot device to carry out the selected action.

2. The method as recited in claim 1, further comprising:
    training the neural network using target values for the evaluations, the target values being ascertained with using a second instance of the neural network according to Double-Deep Q-learning.

3. The method as recited in claim 1, further comprising:
    training the neural network using target values for the evaluations, the target values being ascertained from rewards of control cycles, and the training being carried out in such a way that a sample of the control cycles is given priority over another sample from the control cycles when the evaluation estimated for the sample by the neural network deviates more strongly from the target value for the evaluation than for the other sample.

4. The method as recited in claim 1, wherein an action that is specified by the position of a pixel is an action that is to be carried out at a position of the environment of the robot device that corresponds to the position of the pixel in the value image.

5. The method as recited in claim 1, wherein the neural network is configured to output an output which includes a respective value image for multiple action parameter values, each of the multiple action parameter values describing a control variable of an action or a type of an action.

6. The method as recited in claim 1, wherein the environment of the robot device has multiple objects, and the action parameter values: (i) indicate whether an object is to be displaced or rotated, and/or (ii) indicate directions and/or displacement widths and/or angles of rotation.

7. A robot device including a control device including a processor, the control device configured to control the robot device, the control device configured to:
    acquire an image of an environment of the robot device, the environment being a working range of a robot arm of the robot device;
    process the image using a neural network, the neural network being configured to output from the image for at least one action parameter value, a respective value image with pixel values for multiple pixels, the pixel value for each pixel of the multiple pixels indicating an evaluation of an action that is specified by the action parameter value and the position of the pixel in the value image, and the neural network being configured to ascertain an evaluation of each action from an intermediate evaluation of the action and an evaluation of a state of the environment of the robot device, wherein the neural network has an encoder network and a decoder network with a bottleneck between the encoder network and the decoder network and skip connections between the encoder network and the decoder network;
    select, from multiple actions that characterize a skill of the robot device in each case, a particular action from among the multiple actions for which the pixel value of the pixel in the value image is at a maximum for the action parameter value at the position that specifies the action together with the action parameter value; and
    control the robot device to carry out the selected action.

8. A computer-readable medium on which is stored commands for controlling a robot device, the commands, when executed by a processor, causing the processor to perform the following steps:
    acquiring an image of an environment of the robot device, the environment being a working range of a robot arm of the robot device;
    processing the image using a neural network, the neural network being configured to output from the image for at least one action parameter value, a respective value image with pixel values for multiple pixels, the pixel value for each pixel of the multiple pixels indicating an evaluation of an action that is specified by the action parameter value and the position of the pixel in the value image, and the neural network being configured to ascertain an evaluation of each action from an intermediate evaluation of the action and an evaluation of a state of the environment of the robot device, wherein the neural network has an encoder network and a decoder network with a bottleneck between the encoder network and the decoder network and skip connections between the encoder network and the decoder network;
    selecting, from multiple actions that characterize a skill of the robot device in each case, a particular action from among the multiple actions for which the pixel value of the pixel in the value image is at a maximum for the action parameter value at the position that specifies the action together with the action parameter value; and controlling the robot device to carry out the selected action.

* * * * *